(12) United States Patent
Hirose

(10) Patent No.: US 12,209,633 B2
(45) Date of Patent: Jan. 28, 2025

(54) SUPPORTER

(71) Applicant: MURATA MACHINERY, LTD., Kyoto (JP)

(72) Inventor: Mitsunori Hirose, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 101 days.

(21) Appl. No.: 18/268,712

(22) PCT Filed: Nov. 17, 2021

(86) PCT No.: PCT/JP2021/042227
§ 371 (c)(1),
(2) Date: Jun. 21, 2023

(87) PCT Pub. No.: WO2022/137905
PCT Pub. Date: Jun. 30, 2022

(65) Prior Publication Data
US 2024/0052904 A1    Feb. 15, 2024

(30) Foreign Application Priority Data
Dec. 24, 2020   (JP) ................. 2020-215513

(51) Int. Cl.
*F16F 7/12*      (2006.01)
(52) U.S. Cl.
CPC ................... *F16F 7/123* (2013.01)
(58) Field of Classification Search
CPC . F16F 7/123; F16F 15/04; F16F 15/02; E01D 19/041; E01D 19/04

(Continued)

(56) References Cited

U.S. PATENT DOCUMENTS 1,490,132 A * 4/1924 Sheehy ................. A47B 91/04
                                                    5/104
2,602,616 A * 7/1952 Helmond ................. B41J 29/08
                                                    248/615

(Continued)

FOREIGN PATENT DOCUMENTS

JP      2015-112706 A      6/2015
KR      100950257 B1 *     3/2010

OTHER PUBLICATIONS

Official Communication issued in International Patent Application No. PCT/JP2021/042227, mailed on Dec. 21, 2021.

*Primary Examiner* — Eret C McNichols
(74) *Attorney, Agent, or Firm* — Keating & Bennett, LLP

(57) ABSTRACT

A supporter includes an upper portion including a load receiver on which a projection projecting downward from a supported body is to be mounted and which receives a load of the supported body. The supporter includes a lower portion to be provided on a floor surface and on which the upper portion is to be mounted. The upper portion includes, in a center portion thereof in a plan view, a first flexure that bends downward under the load of the supported body received by the load receiver. The lower portion includes a second flexure that bends downward when pressed by the first flexure bending downward. In the supporter, a sliding region in which the first flexure being bent downward and the second flexure being bent downward as pressed by the first flexure can slide on each other is defined by the load receiver having received the load of the supported body.

10 Claims, 11 Drawing Sheets

(58) Field of Classification Search
USPC ............ 248/568, 615, 622, 677, 678, 188.8,
248/188.9, 188.1
See application file for complete search history.

(56) References Cited

U.S. PATENT DOCUMENTS

| | | | | |
|---|---|---|---|---|
| 2,921,760 | A * | 1/1960 | Wheeler ................ | F16F 1/3615 |
| | | | | 16/42 R |
| 3,601,345 | A * | 8/1971 | Johnson .................. | F16F 1/371 |
| | | | | 248/188.9 |
| 5,310,156 | A * | 5/1994 | Matsumura ............ | A47B 91/00 |
| | | | | 248/188.9 |
| 5,344,116 | A * | 9/1994 | Winkler ................ | D06F 39/125 |
| | | | | 248/677 |
| 5,782,444 | A * | 7/1998 | Anderman ............. | A47B 91/06 |
| | | | | 248/188.4 |
| 6,869,052 | B2 * | 3/2005 | Keast ..................... | A47B 91/06 |
| | | | | 248/346.11 |
| 7,198,238 | B2 * | 4/2007 | Inoue ...................... | F16M 7/00 |
| | | | | 248/188.4 |
| 7,784,753 | B2 * | 8/2010 | Andreoli .................. | F16M 7/00 |
| | | | | 248/188.8 |
| 9,175,468 | B1 * | 11/2015 | Tsai ........................ | E01D 19/04 |
| 9,347,600 | B2 * | 5/2016 | Lillienskjold ............ | F16M 7/00 |
| 11,300,176 | B2 * | 4/2022 | Bonessio ............... | F16F 15/021 |
| 11,898,821 | B2 * | 2/2024 | Crepy .................. | F16F 15/021 |
| 2010/0044546 | A1 * | 2/2010 | Harris ................... | B82Y 10/00 |
| | | | | 264/277 |
| 2011/0198458 | A1 * | 8/2011 | Karl ...................... | A47C 7/002 |
| | | | | 248/188.4 |

* cited by examiner

SUPPORTER

BACKGROUND OF THE INVENTION

1. Field of the Invention

The present invention relates to a supporter.

2. Description of the Related Art

Supporters for supporting a supported body and suppressing vibration of the supported body are known (for example, see Japanese Unexamined Patent Application, First Publication No. 2015-112706). A supporter disclosed in Japanese Unexamined Patent Application, First Publication No. 2015-112706 includes an upper member including a load receiver on which a projection projecting downward from a supported body is to be mounted and which receives the load of the supported body, and a lower member which is arranged on a floor surface and on which the upper member is to be mounted. The supporter disclosed in Japanese Unexamined Patent Application, First Publication No. 2015-112706 is such that when the supported body vibrates, vibration of the supported body is suppressed, using frictional damping that occurs at the contact surface between the upper member and the lower member.

SUMMARY OF THE INVENTION

The supporter disclosed in Japanese Unexamined Patent Application, First Publication No. 2015-112706 uses frictional damping to suppress vibration of the supported body, however, the supporter is of a structure in which the upper member simply slides sideways relative to the lower member. Therefore, the effect of frictional damping is unlikely to be achieved unless significant vibrations occur.

Accordingly, preferred embodiments of the present invention provide supporters each capable of reducing or preventing, irrespective of a magnitude of vibration, transmission of vibration of a supported body to a floor surface and transmission of vibration of the floor surface to the supported body.

According to a first aspect of a preferred embodiment of the present invention, a supporter includes an upper portion including a load receiver on which a projection projecting downward from a supported body is to be mounted and which receives a load of the supported body. The supporter includes a lower portion to be provided on a floor surface and on which the upper portion is to be mounted. The upper portion includes, in a center portion thereof in a plan view, a first flexure that bends downward under the load of the supported body received by the load receiver. The lower portion includes a second flexure that bends downward when pressed by the first flexure bending downward. In the supporter, a sliding region in which the first flexure being bent downward and the second flexure being bent downward as pressed by the first flexure can slide on each other is defined by the load receiver having received the load of the supported body.

According to a second aspect of a preferred embodiment of the present invention, a supporter includes an upper portion including a load receiver on which a projection projecting downward from a supported body is to be mounted and which receives a load of the supported body. The supporter includes a lower portion to be provided on a floor surface and on which the upper portion is to be mounted. The upper portion includes, in a center portion thereof in a plan view, a flexure that bends downward under the load of the supported body received by the load receiver. The upper portion includes, in a portion that surrounds the flexure, a contact that comes in contact with the lower portion. An attitude of the contact changes as the flexure bends downward. In the supporter, a sliding region in which the contact, the attitude of which changed as the flexure bent downward, and the lower portion can slide on each other is defined by the load receiver having received the load of the supported body.

The supporters according to preferred embodiments of the present invention are each capable of reducing or preventing, irrespective of the magnitude of vibration, transmission of vibration of a supported body to a floor surface and transmission of vibration of the floor surface to the supported body.

The supporter of the first aspect is such that when the supported body or the floor surface vibrates, the first flexure and the second flexure slide on each other within the sliding region. As a result, when the supported body vibrates, the first flexure and the second flexure slide on each other within the sliding region, which makes it possible to reduce or prevent transmission of the vibration of the supported body to the floor surface. Also, when the floor surface vibrates, the first flexure and the second flexure slide on each other within the sliding region, which makes it possible to reduce or prevent transmission of the vibration of the floor surface to the supported body.

A gap may be located between the first flexure and the second flexure of the supporter of the first aspect when the load receiver is not receiving the load of the supported body. As a result, it is possible to favorably define a sliding region in which, when a projection is mounted on the load receiver, the first flexure being bent downward and the second flexure being bent downward as pressed by the first flexure can slide on each other.

The lower portion of the supporter of the first aspect may include a plurality of legs in contact with the floor surface. The lower portion may also include an indentation included in the second flexure and surrounded by the plurality of legs. As a result, when the projection is mounted on the load receiver, it is possible to achieve a favorable bend in the second flexure as pressed by the first flexure.

The upper portion of the supporter of the first aspect may have a rigidity lower than that of the lower portion. As a result, when a projection is mounted on the load receiver, the amount of downward bending of the first flexure and the amount of downward bending of the second flexure can be made different, which makes it possible to favorably form the sliding region.

The supporter of the second aspect is such that when the supported body or the floor surface vibrates, the contact and the lower portion slide on each other within the sliding region. As a result, when the supported body vibrates, the contact and the lower portion slide on each other within the sliding region, which makes it possible to reduce or prevent transmission of the vibration of the supported body to the floor surface. Also, when the floor surface vibrates, the contact and the lower portion slide on each other within the sliding region, which makes it possible to reduce or prevent transmission of the vibration of the floor surface to the supported body.

In either one of a lower surface of the upper portion and an upper surface of the lower portion of the supporter of the first aspect and the second aspect, a fitted portion with a recessed shape may be provided, and in the other, a fitting portion which is to be fitted in the fitted portion and has a raised shape may be provided. As a result, even when the supported body or the floor surface vibrates while a projection is mounted on the load receiver, it is possible to reduce or prevent excessive sliding of the upper portion relative to the lower portion.

In a plan view, the upper portion and the lower portion of the supporter of the first aspect and the second aspect may both include a circular outer edge with a same diameter. As a result, when a projection is mounted on the load receiver, it is possible to define the sliding region at a favorable position in a plan view.

The load receiver of the supporter of the first aspect and the second aspect may include a bottom of a recess into which a projection can be inserted. As a result, insertion of the projection projecting downward from the supported body into the recess makes favorable mounting of the projection possible.

It should be noted that the above summary of the invention does not necessarily describe all necessary features of the present invention but various preferred embodiments of the present invention may also reside in a sub-combination of the described features.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, the present invention will be described through preferred embodiments and modifications and combinations thereof. However, the present invention defined in the claims is not limited to the following preferred embodiments, and not all combinations of features described in the preferred embodiments are essential.

Figure 1:
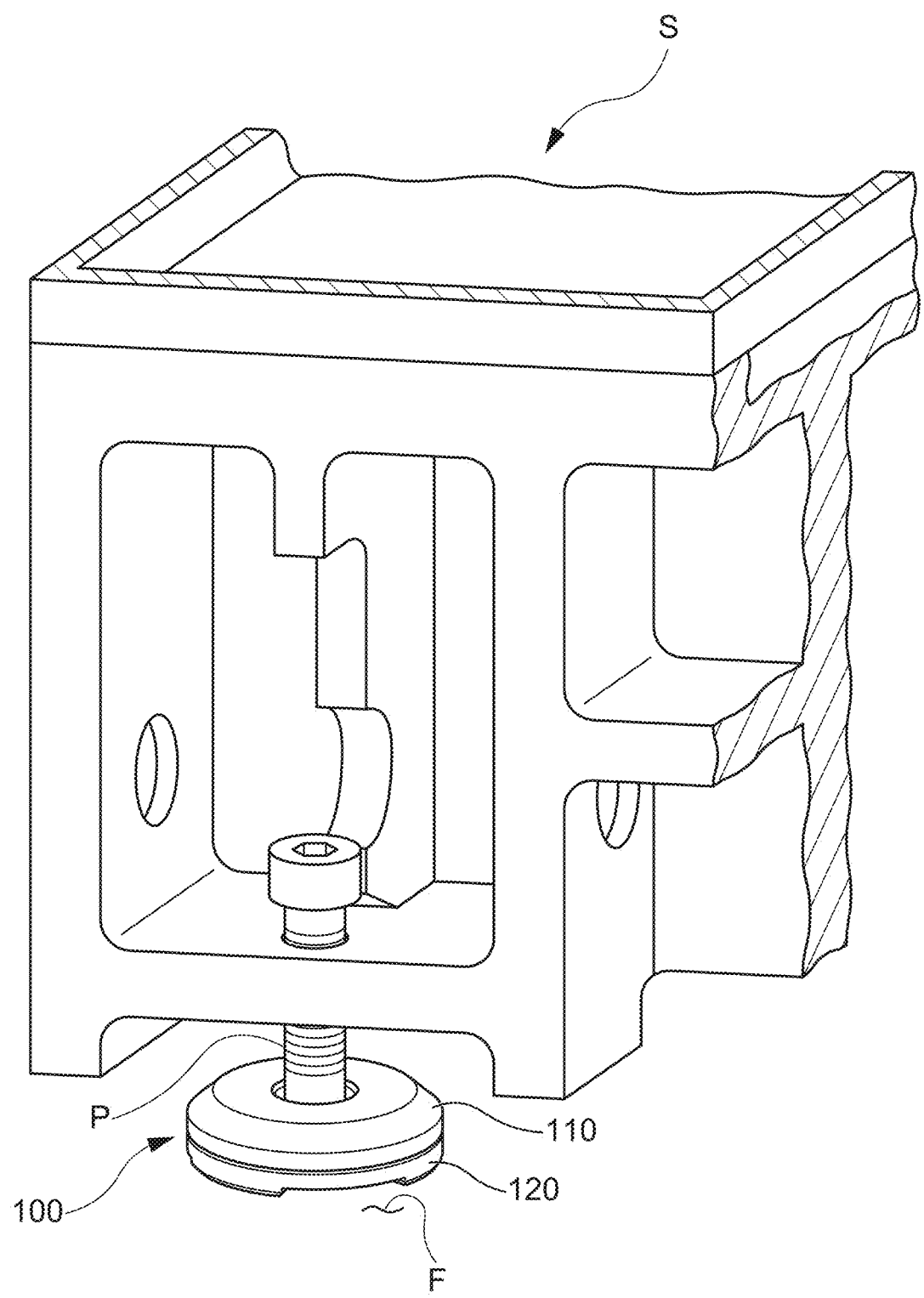
FIG. 1 is a diagram schematically showing an example of a usage mode of a supporter 100.

FIG. 1 is a diagram schematically showing an example of a usage mode of a supporter 100. The supporter 100 is a member that supports a supported body S. The supporter 100 shown in FIG. 1 supports a machine tool serving as the supported body S, and the machine tool is an example of the supported body S. The supporter 100 includes an upper member 110 and a lower member 120. The lower member 120 is arranged on a floor surface F, and on which the upper member 110 is to be mounted.

Figure 2:
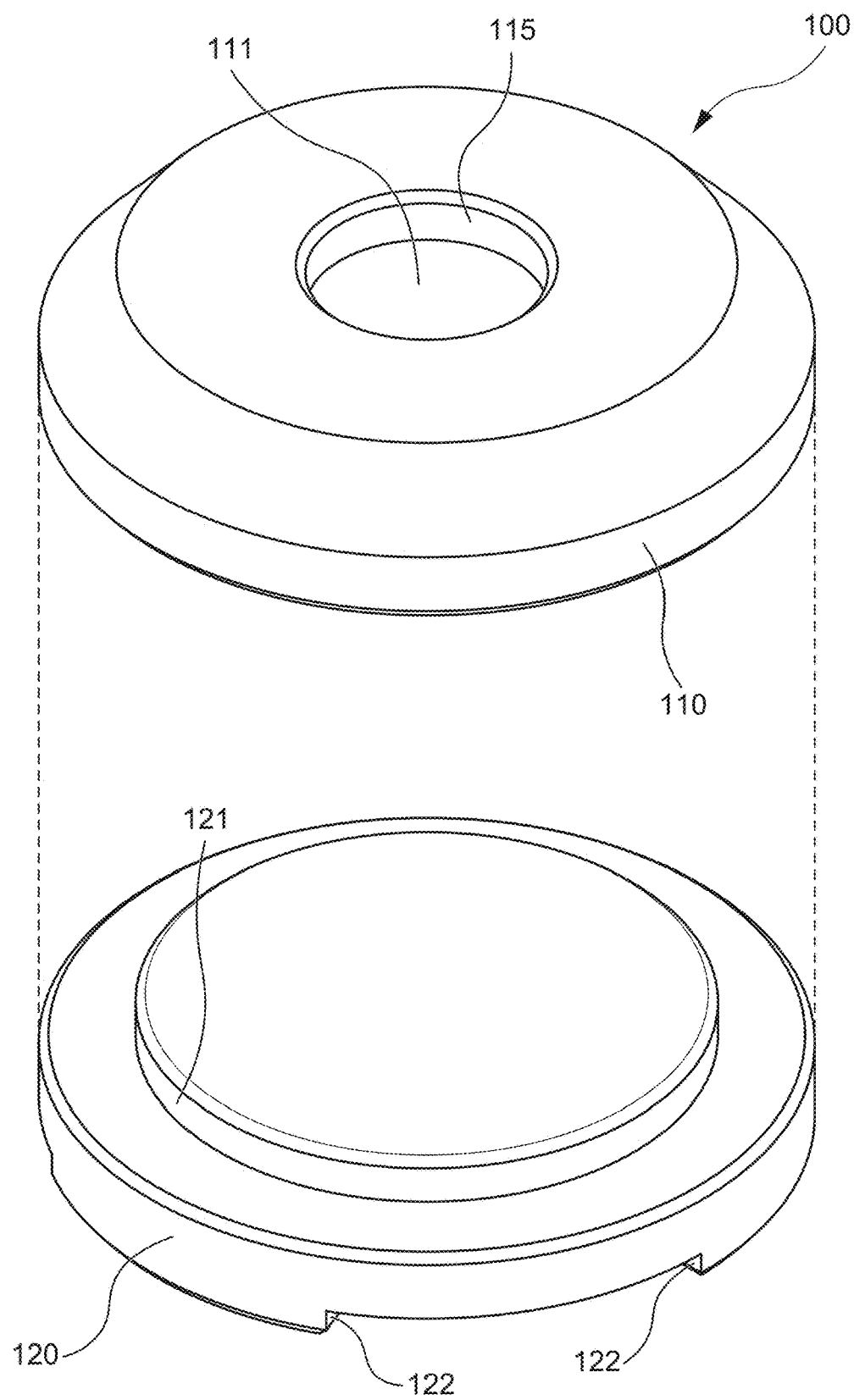
FIG. 2 is a perspective view of a state in which an upper member 110 and a lower member 120 are separated from each other, as viewed obliquely from above.
Figure 3:
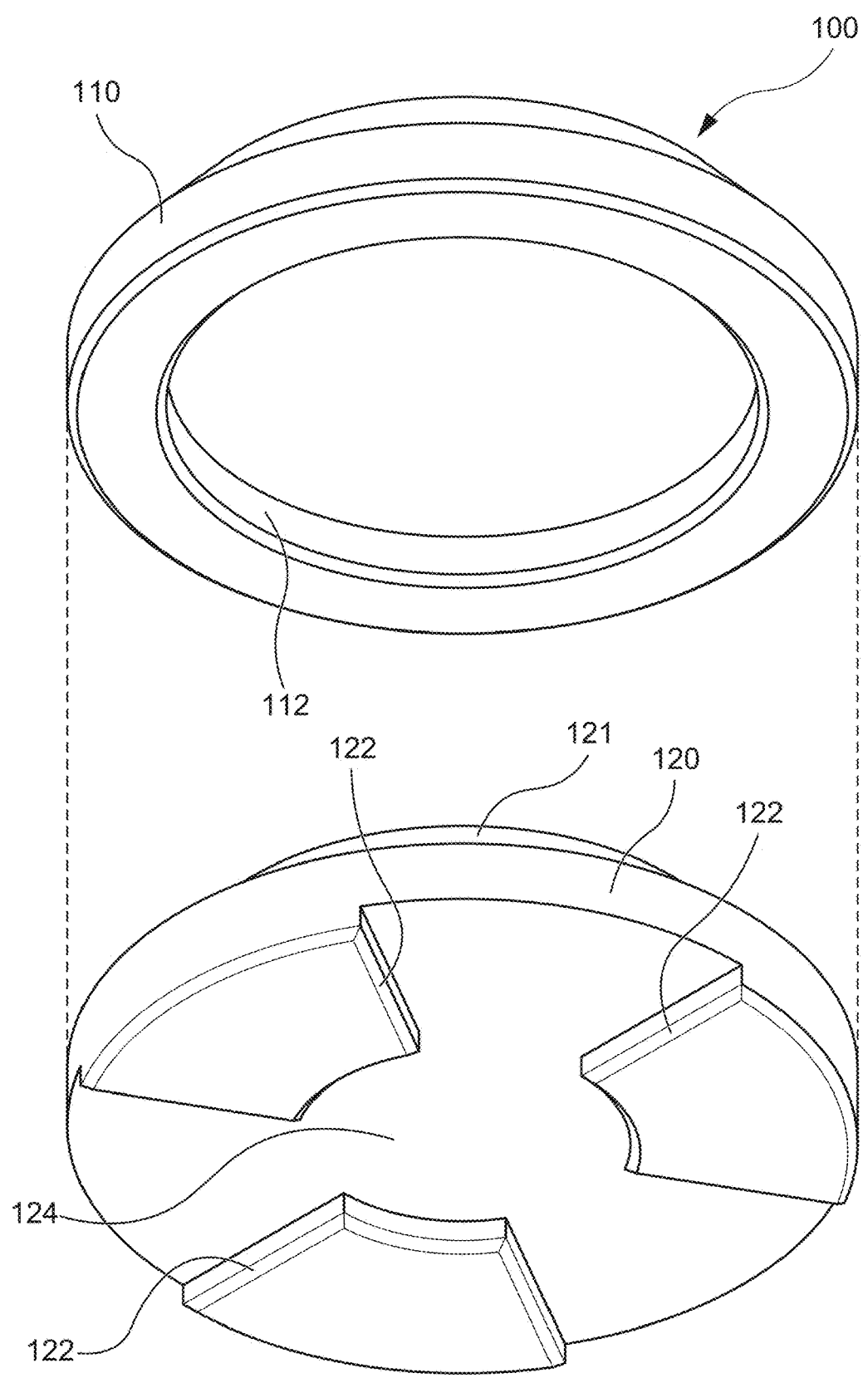
FIG. 3 is a perspective view of a state in which the upper member 110 and the lower member 120 are separated from each other, as viewed obliquely from below.
Figure 4:
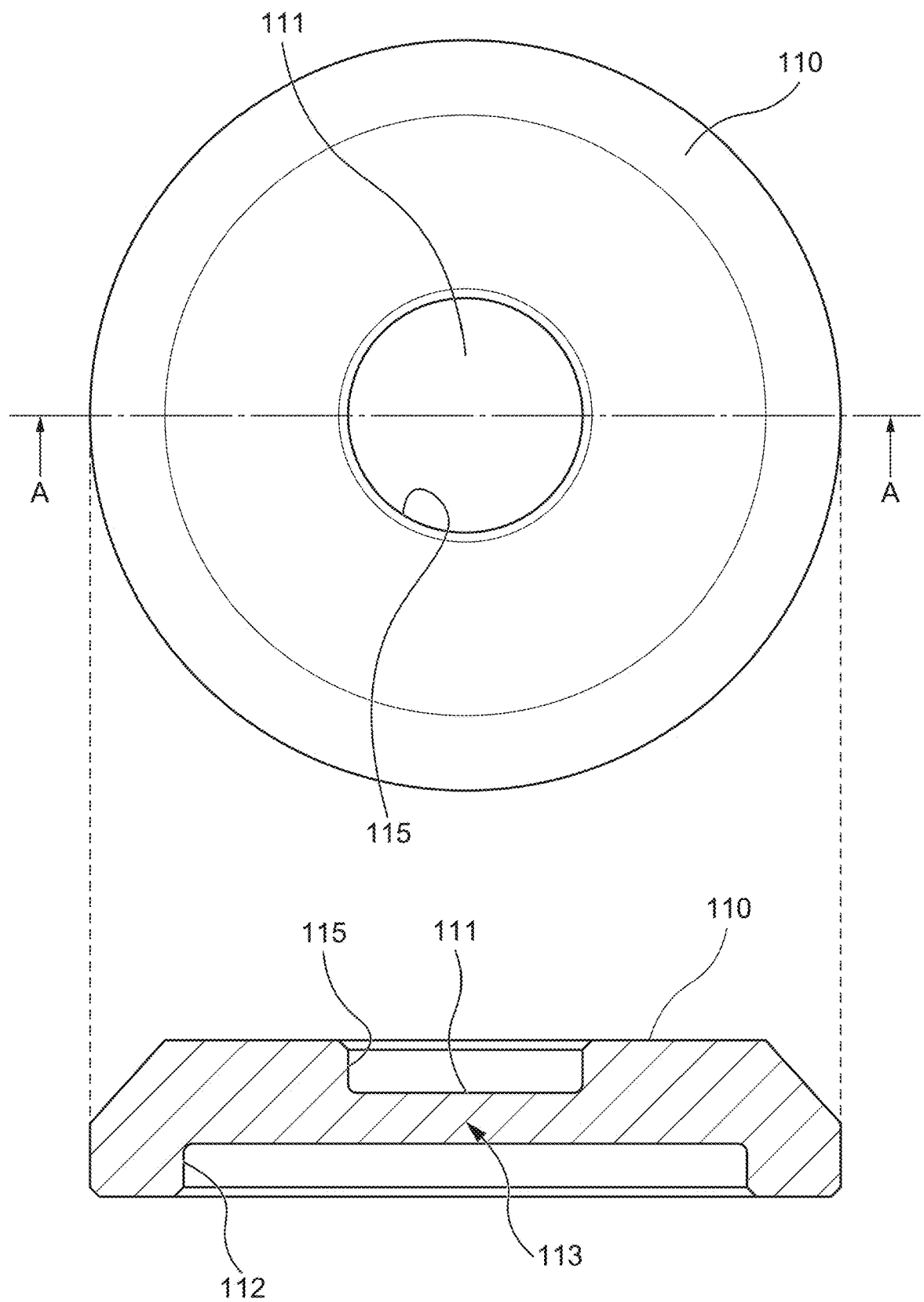
FIG. 4 includes a plan view of the upper member 110 as viewed from above, and a cross-sectional view showing a cross section taken along line A-A in the plan view.
Figure 5:
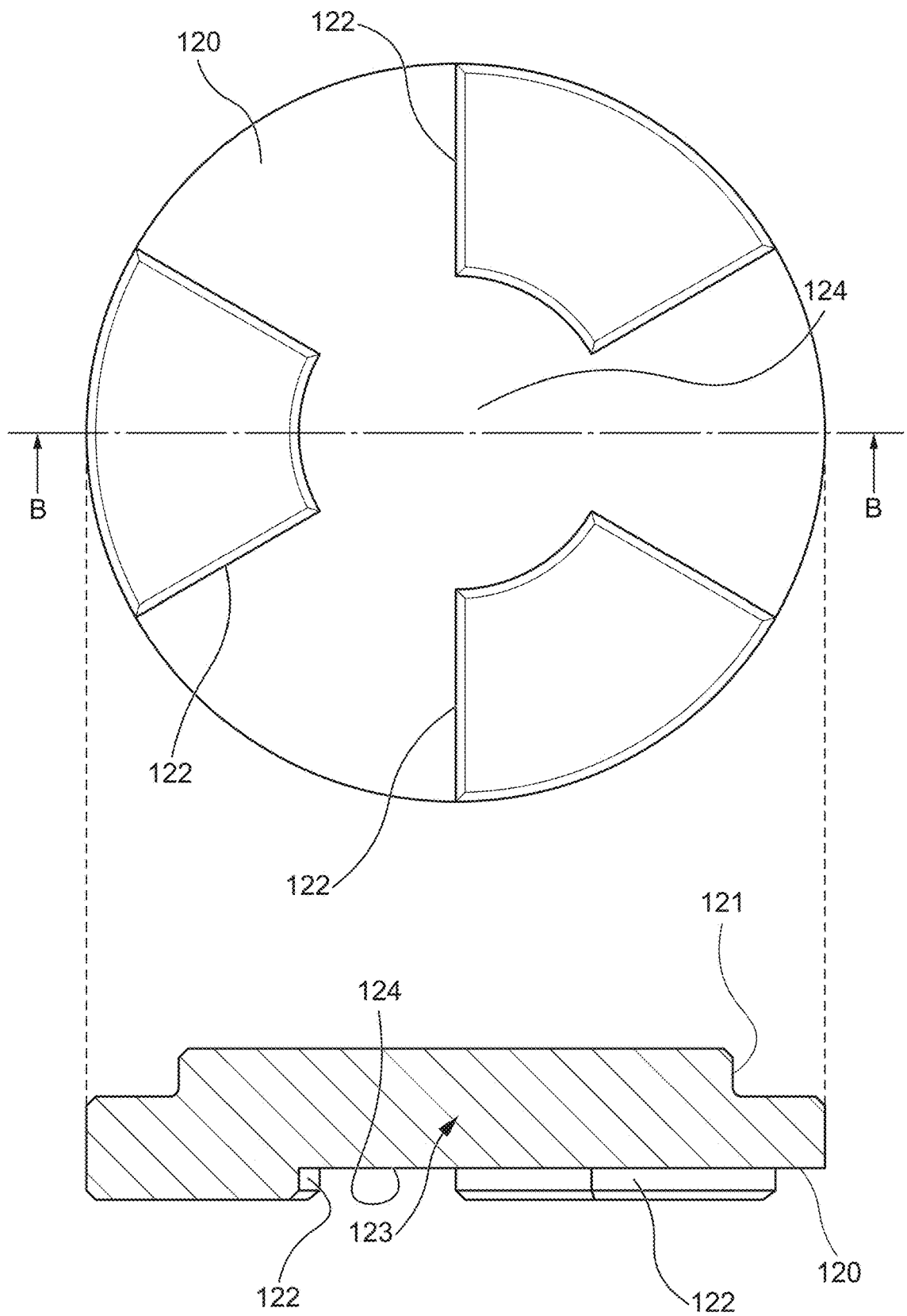
FIG. 5 includes a plan view of the upper member 120 as viewed from below, and a cross-sectional view showing a cross section taken along line B-B in the plan view.

FIG. 2 is a perspective view of a state in which the upper member 110 and the lower member 120 are separated from each other, as viewed obliquely from above. FIG. 3 is a perspective view of a state in which the upper member 110 and the lower member 120 are separated from each other, as viewed obliquely from below. FIG. 4 includes a plan view of the upper member 110 as viewed from above, and a cross-sectional view showing a cross section taken along line A-A in the plan view. FIG. 5 includes a plan view of the upper member 120 as viewed from below, and a cross-sectional view showing a cross section taken along line B-B in the plan view.

The upper member 110 includes a load receiver 111 on which a projection P projecting downward from the supported body S is to be mounted and which receives the load of the supported body S. For example, when the supported body S is a machine tool, a height adjustment bolt, which projects downward from the machine tool, is mounted on the load receiver 111, to thereby receive the load of the machine tool. The height adjustment bolt is an example of the projection P.

As shown in FIG. 4, the upper member 110 preferably has a circular or substantially circular shape in a plan view. As shown in FIG. 5, the lower member 120 preferably has a circular or substantially circular shape in a plan view. As shown in FIG. 2 and FIG. 3, the upper member 110 and the lower member 120 have the same outer edge diameter in a plan view.

As shown in FIG. 2 and FIG. 4, in the center portion in a plan view of an upper portion of the upper member 110, a recess 115 into which the projection P of the supported body S can be inserted provided. The load receiver 111 includes the bottom of the recess 115.

As shown in FIG. 3 and FIG. 4, a fitted portion 112 having a recessed shape is provided in a lower surface of the upper member 110. On the other hand, as shown in FIG. 2 and FIG. 5, a fitting portion 121 having a raised shape that is to be fitted in the fitted portion 112 is provided in an upper surface of the lower member 120. In the upper member 110 shown in FIG. 3 and FIG. 4, a fitted portion 112 having a circular or substantially circular shape in a plan view with a diameter sufficiently greater than that of the load receiver 111 is provided. On the other hand, in the lower member 120 shown in FIG. 2 and FIG. 5, the fitting portion 121 having a diameter slightly smaller in a plan view than that of the fitted portion 112 is provided so that it can be fitted in the fitted portion 112 of the upper member 110. It should be noted that the fitted portion having a recessed shape may be provided in the upper surface of the lower member 120. In such a case, a fitting portion having a raised shape that is to be fitted in the fitted portion of the lower member 120 is provided in the lower surface of the upper member 110.

As shown in FIG. 3 and FIG. 5, the lower member 120 includes a plurality of legs 122 in contact with the floor surface F. In the center portion surrounded by the plurality of legs 122 in a plan view, an indentation 124 indented upward from the lower surfaces of the legs 122 is provided. The lower member 120 shown in FIG. 3 and FIG. 5 includes, in regions other than the center portion thereof in the plan view, three of the legs 122 at equal or substantially equal intervals in the circumferential direction.

As shown in FIG. 4, the upper member 110 includes, in the center portion thereof in a plan view, a first flexure 113 that bends downward under the load of the supported body S received by the load receiver 111. As shown in FIG. 5, in the portion surrounded by the plurality of legs 122, the lower member 120 includes the indentation 124 included in the second flexure 123 that is bent downward as pressed by the first flexure 113 of the upper member 110 being bent downward.

Figure 6:
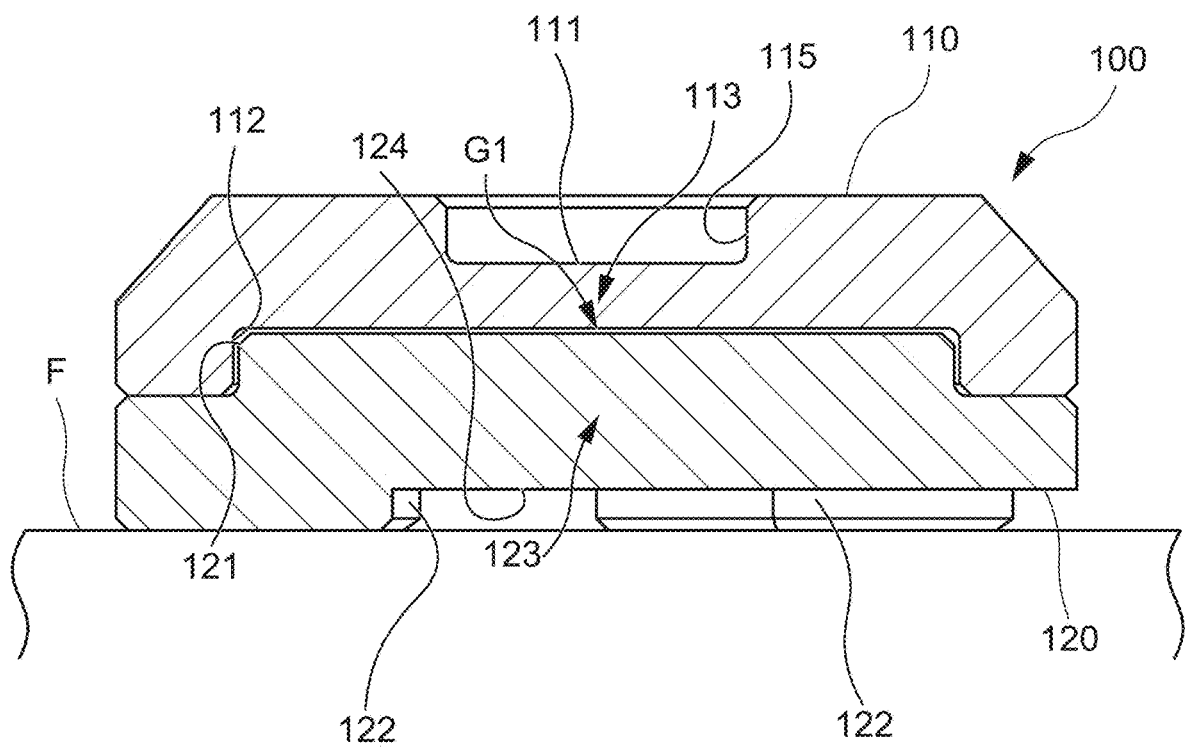
FIG. 6 is a cross-sectional view of the supporter 100 showing a state in which a load receiver 111 is not receiving the load of a supported body S.
Figure 7:
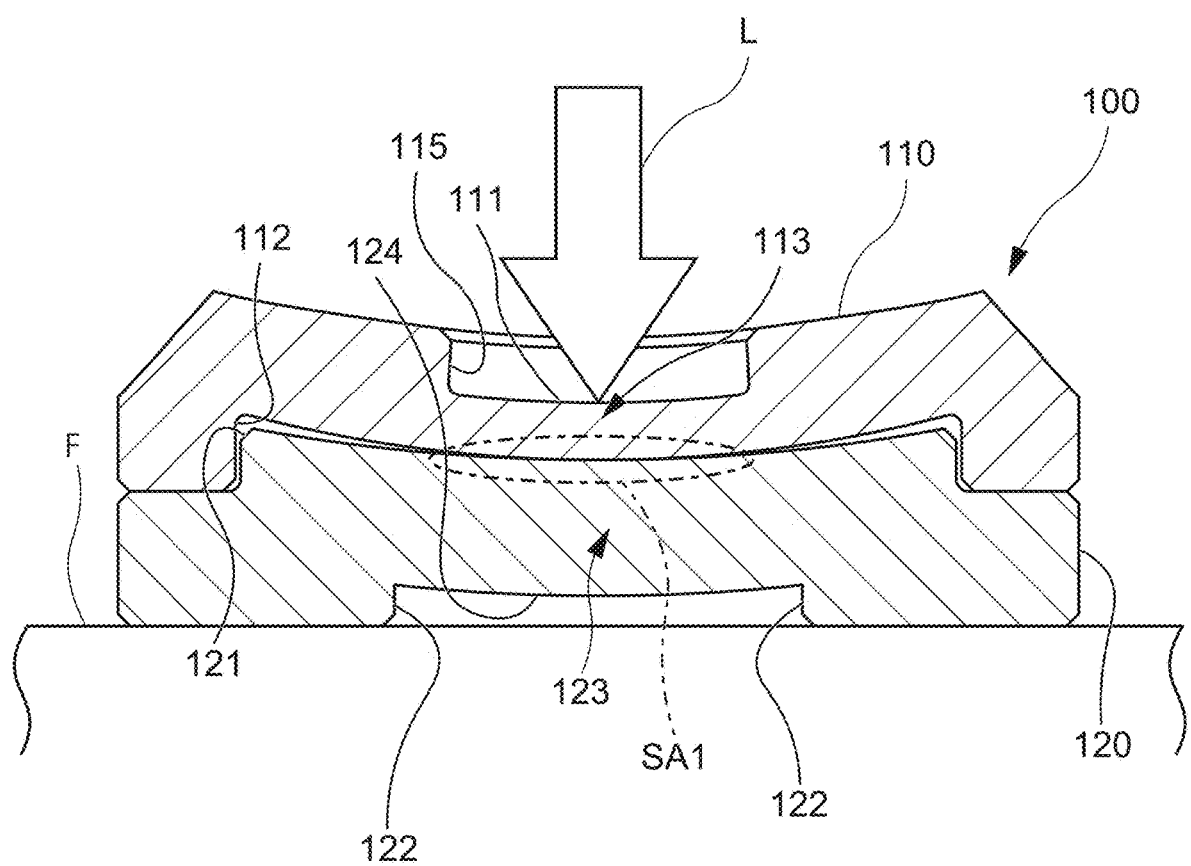
FIG. 7 is a cross-sectional view of the supporter 100 showing a state in which the load receiver 111 is receiving the load of the supported body S.
Figure 8:
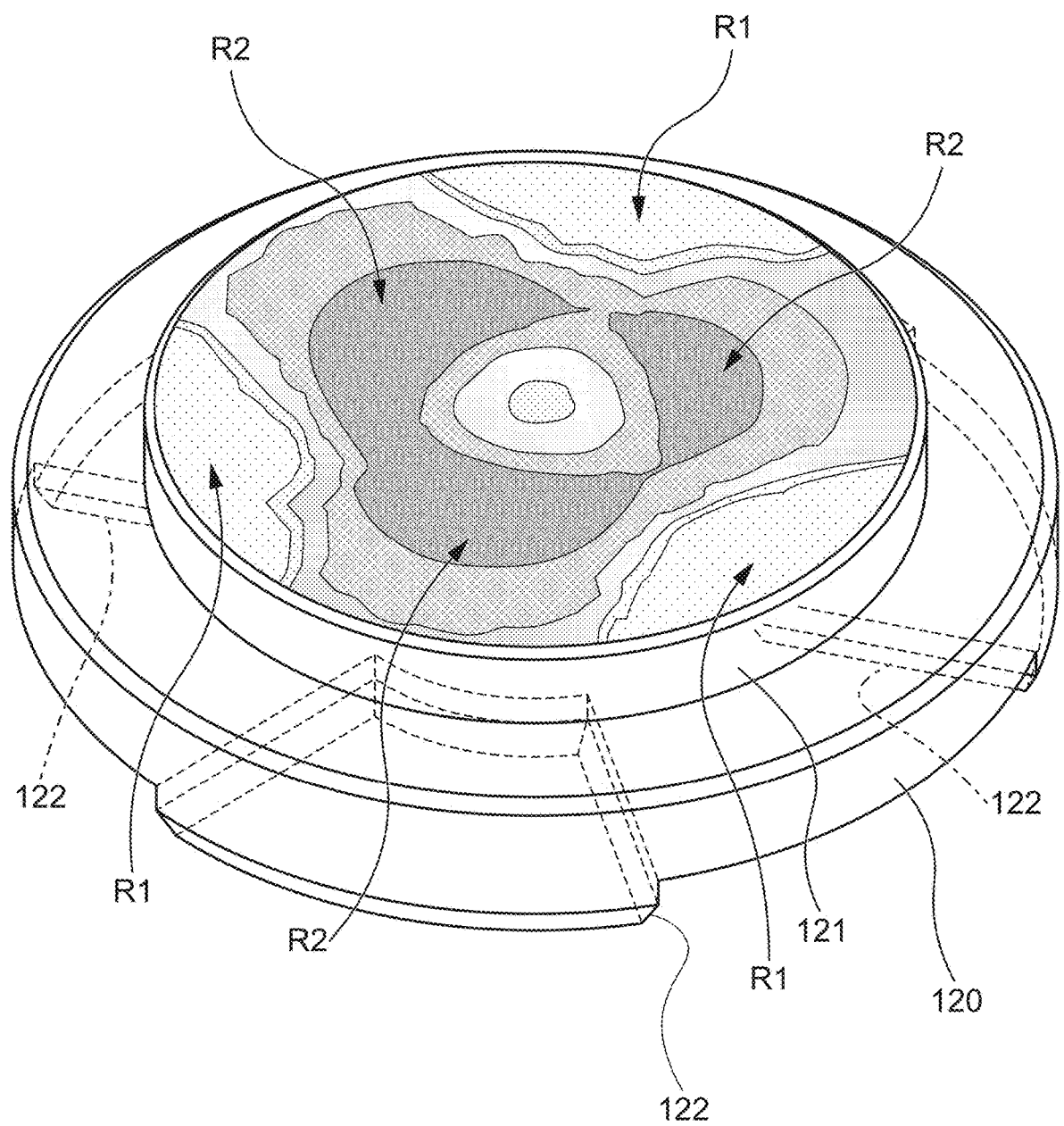
FIG. 8 is a diagram showing a distribution of contact pressure exerted on the lower member 120 when pressed by a first flexure 113 of the upper member 110 being bent downward.

FIG. 6 is a cross-sectional view of a supporter 100 showing a state in which the load receiver 111 is not receiving the load of the supported body S. FIG. 7 is a cross-sectional view of the supporter 100 showing a state in which the load receiver 111 is receiving the load of the supported body S. FIG. 8 is a diagram showing a distribution of contact pressure exerted on the lower member 120 when pressed by the first flexure 113 of the upper member 110 being bent downward.

When arranging the supported body S on the floor surface F, the supporter 100 is arranged directly underneath the projection P projecting downward from the supported body S while the fitting portion 121 of the lower member 120 is fitted in the fitted portion 112 of the upper member 110. In the example shown in FIG. 1, the supporter 100 is arranged directly underneath the height adjustment bolt projecting downward from the machine tool.

When the load receiver 111 of the upper member 110 is not receiving the load of the supported body S, a gap G1 is formed between the lower surface of the first flexure 113 of the upper member 110 and the upper surface of the second flexure 123 of the lower member 120, as shown in FIG. 6.

When the projection P of the supported body S is mounted on the load receiver 111 of the upper member 110 and the load receiver 111 receives a load L of the supported body S as shown in FIG. 7, the first flexure 113 of the upper member 110 bends downward. As the first flexure 113 of the upper member 110 bends downward, the second flexure 123 of the lower member 120 is pressed by the first flexure 113 of the upper member 110 and bends downward. At this time, in the second flexure 123 of the lower member 120, as shown in FIG. 8, a contact pressure higher than that exerted in a region R1 not corresponding to the positions of the legs 122 in a plan view is exerted in a region R2 corresponding to the positions of the legs 122. Such a contact pressure distribution as shown in FIG. 8 can be realized by selecting thicknesses, materials, and so forth of the upper member 110 and the lower member 120 that make the rigidity of the lower member 120 lower than that of the upper member 110.

As a result, in the supporter 100, a sliding region SA1 in which the first flexure 113 of the upper member 110 being bent downward and the second flexure 123 of the lower member 120 being bent downward as pressed by the first flexure 113 can slide on each other, is provided. When the supported body S vibrates, the first flexure 113 and the second flexure 123 slide on each other in the sliding region SA1, whereby the supporter 100 in the state where the sliding region SA1 has been formed reduces or prevents transmission of the vibration of the supported body S to the floor surface F. Also, when the floor surface F vibrates, the first flexure 113 and the second flexure 123 slide on each other in the sliding region SA1, whereby the supporter 100 in the state where the sliding region SA1 has been formed reduces or prevents transmission of the vibration of the floor surface F to the supported body S.

As described above, the supporter 100 includes the upper member 110 including the load receiver 111 on which the projection P projecting downward from the supported body S is to be mounted and which receives the load L of the supported body S. The supporter 100 also includes the lower member 120 which is arranged on the floor surface F and on which the upper member 110 is to be mounted. The upper member 110 includes, in the center portion thereof in a plan view, the first flexure 113 that bends downward under the load L of the supported body S received by the load receiver 111. The lower member 120 includes the second flexure 123 that bends downward when pressed by the first flexure 113 bending downward. In the supporter 100, the sliding region SA1 in which the first flexure 113 being bent downward and the second flexure 123 being bent downward as pressed by the first flexure 113 can slide on each other is defined by the load receiver 111 having received the load L of the supported body S. As a result, it is possible to reduce or prevent, irrespective of the magnitude of vibration, transmission of vibration of the supported body S to the floor surface F and transmission of vibration of the floor surface F to the supported body S.

In the supporter 100, when the supported body S or the floor surface F vibrates, the first flexure 113 and the second flexure 123 slide on each other within the sliding region SA1. As a result, when the supported body S vibrates, the first flexure 113 and the second flexure 123 slide on each other within the sliding region SA1, which makes it possible to reduce or prevent transmission of the vibration of the supported body S to the floor surface F. Also, when the floor surface F vibrates, the first flexure 113 and the second flexure 123 slide on each other within the sliding region SA1, which makes it possible to reduce or prevent transmission of the vibration of the floor surface F to the supported body S.

The gap G1 may formed between the first flexure 113 and the second flexure 123 when the load receiver 111 is not receiving the load L of the supported body S. As a result, it is possible to favorably structure the sliding region SA1 such that, when the projection P is mounted on the load receiver 111, the first flexure 113 and the second flexure 123 can slide on each other.

The lower member 120 may include the plurality of legs 122 that come in contact with the floor surface F. The lower member 120 may also include the indentation 124 included in the second flexure 123 and surrounded by the plurality of legs. As a result, when the projection P is mounted on the load receiver 111, it is possible to achieve a favorable bend in the second flexure 123 as pressed by the first flexure 113.

The upper member 110 may have a rigidity lower than that of the lower member 120. As a result, when the projection P is mounted on the load receiver 111, the amount of downward bending of the first flexure 113 and the amount of downward bending of the second flexure 123 can be made different, and the sliding region SA1 can be favorably provided.

In either one of the lower surface of the upper member 110 and the upper surface of the lower member 120, the fitted portion having a recessed shape may be provided, and in the other, the fitting portion which is to be fitted in the fitted portion and has a raised shape may be provided. As a result, even when the supported body S or the floor surface F vibrates while the projection P is mounted on the load receiver 111, it is possible to reduce or prevent excessive sliding of the upper member 110 relative to the lower member 120.

The upper member 110 and the lower member 120, in a plan view, may both have a circular or substantially circular outer edge with the same diameter. As a result, when the projection P is mounted on the load receiver 111, it is possible to provide the sliding region SA1 at a favorable position in the plan view.

The load receiver 111 may include the bottom of the recess 115 into which the projection P can be inserted. As a result, insertion of the projection P projecting downward from the supported body S into the recess 115 makes favorable mounting of the projection P possible.

Figure 9:
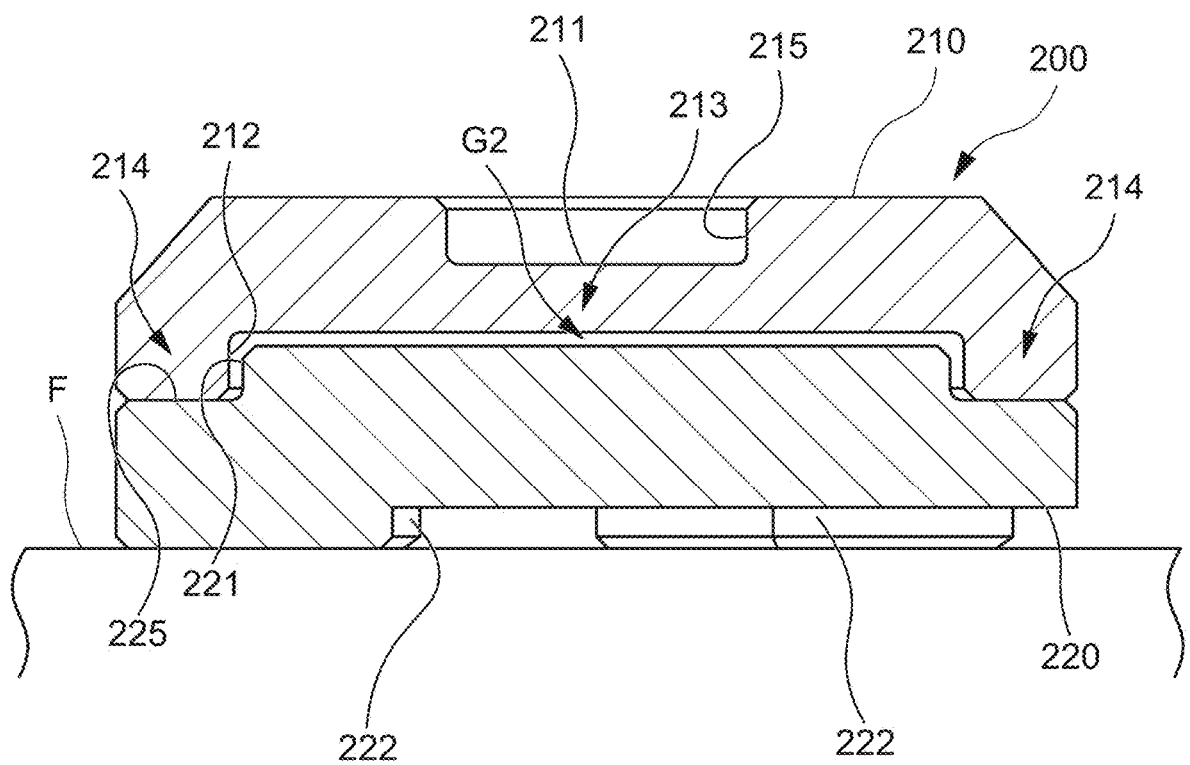
FIG. 9 is a cross-sectional view of a supporter 200 showing a state in which a load receiver 211 is not receiving the load of the supported body S.
Figure 10:
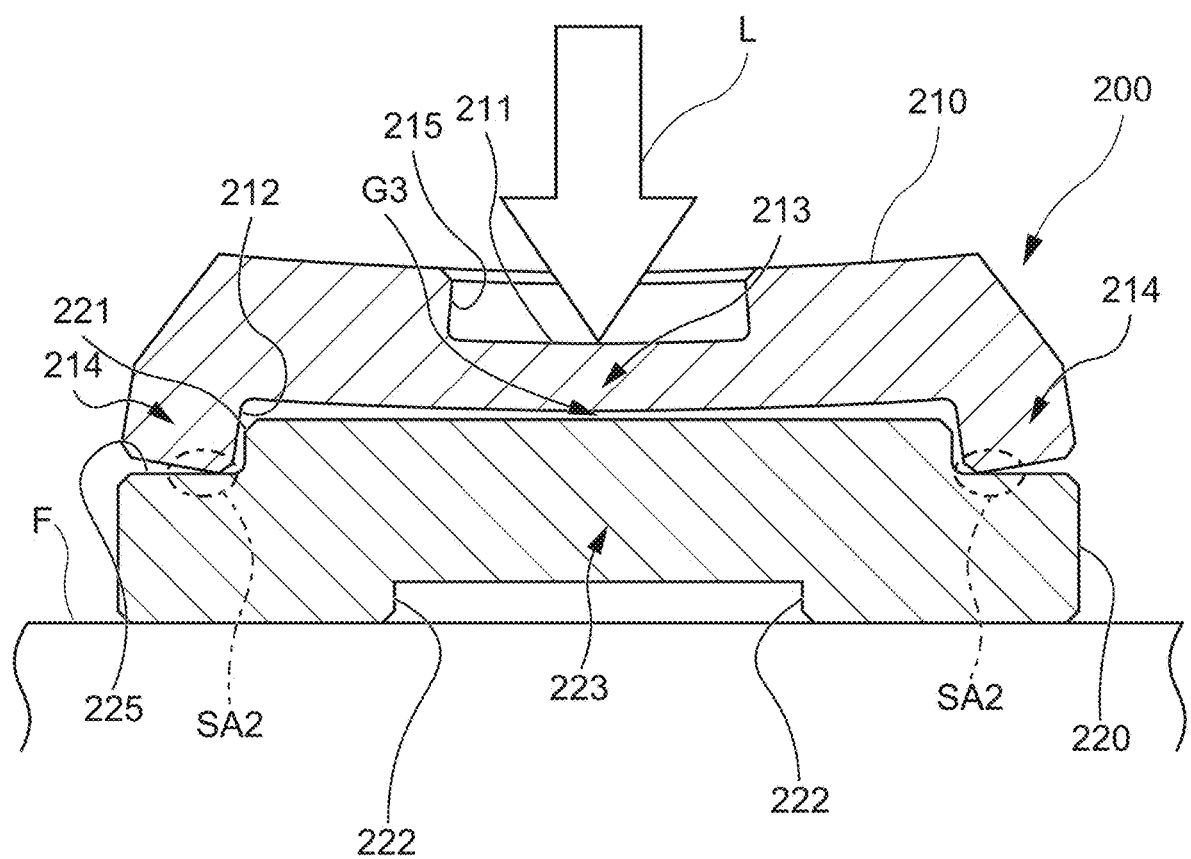
FIG. 10 is a cross-sectional view of the supporter 200 showing a state in which the load receiver 211 is receiving the load of the supported body S.
Figure 11:
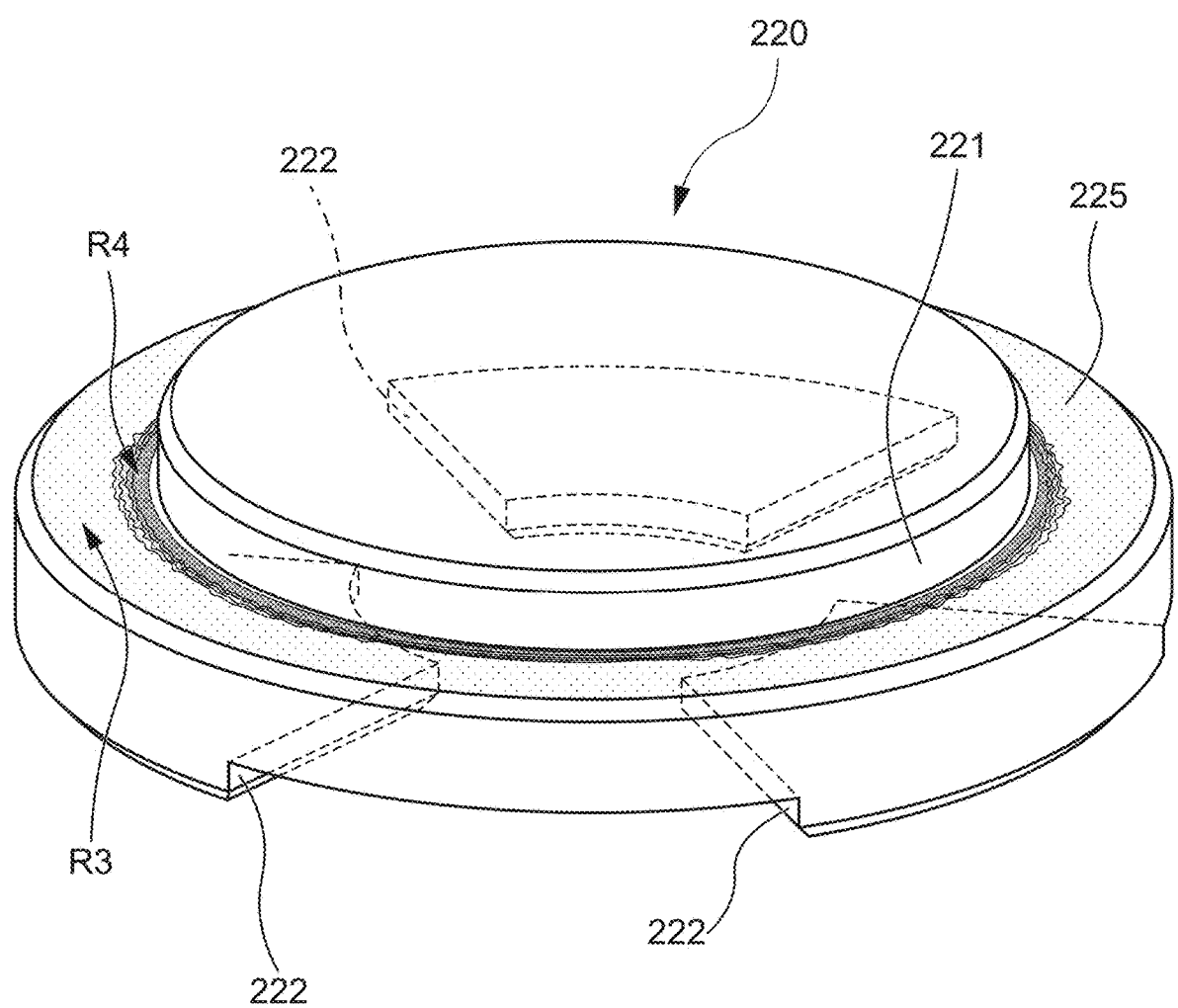
FIG. 11 is a diagram showing a distribution of contact pressure exerted on a lower member 220 when the attitude of a contact 214 changes as a flexure 213 bends downward.

FIG. 9 to FIG. 11 are diagrams showing a supporter 200 according to another preferred embodiment. FIG. 9 is a cross-sectional view of the supporter 200 showing a state in which the load receiver 211 is not receiving the load of the supported body S. The supporter 200 is a member that supports the supported body S. The supporter 200 includes an upper member 210 and a lower member 220.

The upper member 210 is a member that includes a load receiver 211 on which the projection P projecting downward from the supported body S is to be mounted and which receives the load of the supported body S. The lower member 220 is a member that is arranged on the floor surface F, and on which the upper member 210 is to be mounted.

As with the upper member 110 of the supporter 100, the upper member 210 is a member having a circular or substantially circular shape in a plan view. As with the lower member 120 of the supporter 100, the lower member 220 is a member having a circular or substantially circular shape in the plan view. As with the upper member 110 and the lower member 120 of the supporter 100, the upper member 210 and the lower member 220 have the same outer edge diameter in the plan view.

In the center portion in the plan view of an upper portion of the upper member 210, a recess 215 into which the projection P of the supported body S can be inserted is provided. The load receiver 211 is the bottom of the recess 215.

In a lower surface of the upper member 210, a fitted portion 212 having a recessed shape is provided. On the other hand, in an upper surface of the lower member 220, a fitting portion 221 having a raised shape that is to be fitted in the fitted portion 212 of the upper member 210 is provided. In the upper member 210 shown in FIG. 9, the fitted portion 212 having a circular or substantially circular shape in the plan view with a diameter sufficiently greater than that of the load receiver 211 is provided. On the other hand, in the lower member 120, the fitting portion 221 having a diameter slightly smaller in the plan view than that of the fitted portion 212 is provided so that it can be fitted in the fitted portion 212 of the upper member 210. It should be noted that the fitted portion having a recessed shape may be provided in the upper surface of the lower member 220. In such a case, a fitting portion having a raised shape that is to be fitted in the fitted portion of the lower member 220 is provided in the lower surface of the upper member 210.

The lower member 120 includes a plurality of legs 222 that come in contact with the floor surface F. The lower member 220 shown in FIG. 9 includes, in regions other than the center portion thereof in the plan view, three of the legs 222 at equal or substantially equal intervals in the circumferential direction.

The upper member 210 includes, in the center portion thereof in the plan view, a flexure 213 that bends downward under the load of the supported body S received by the load receiver 211. The upper member 210 also includes, in a portion that surrounds the flexure 213, a contact that comes in contact with a planar surface 225 of the lower member 220. The attitude of the contact 214 changes as the flexure 213 bends downward.

FIG. 10 is a cross-sectional view of the supporter 200 showing a state in which the load receiver 211 is receiving the load L of the supported body S. FIG. 11 is a diagram showing a distribution of contact pressure exerted on the lower member 220 when the attitude of the contact 214 changes as the flexure 213 bends downward.

When arranging the supported body S on the floor surface F, the supporter 200 is arranged directly underneath the projection P projecting downward from the supported body S while the fitting portion 221 of the lower member 220 is fitted in the fitted portion 212 of the upper member 210.

When the load receiver 211 of the upper member 210 is not receiving the load L of the supported body S, a gap G2 is formed between the lower surface of the flexure 213 of the upper member 210 and the upper surface of the lower member 220, as shown in FIG. 9. The gap G2 is set to a size such that when the load receiver 211 of the upper member 210 receives the load L of the supported body S, the lower surface of the flexure 213 of the upper member 210 and the upper surface of the lower member 220 do not come in contact with each other. When the load receiver 211 of the upper member 210 is not receiving the load L of the supported body S, the entire lower surface of the contact 214 of the upper member 210 is in contact with a planar surface 225 of the lower member 220, as shown in FIG. 9.

When the projection P of the supported body S is mounted on the load receiver 211 of the upper member 210 and the load receiver 211 receives the load L of the supported body S as shown in FIG. 10, the flexure 213 of the upper member 210 bends downward. Between the lower surface of the flexure 213 of the upper member 210 and the upper surface of the lower member 220, a gap G3 smaller than the gap G2 is still formed even when the flexure 213 of the upper member 210 bends downward. The lower surface of the flexure 213 of the upper member 210 and the upper surface of the lower member 220 not coming in contact with each other cause the contact 214 of the upper member 210 to be pushed radially outward in the plan view, and the attitude thereof changes as shown in FIG. 10. A radially outer portion of the lower surface of the contact 214 of the upper member 210 separates and rises from the planar surface 225 of the lower member 220, and a radially inner portion of the lower surface of the contact 214 comes in contact with the planar surface 225. At this time, as shown in FIG. 11, contact pressure is not exerted in a region R3 in which the planar surface 225 of the lower member 220 is not in contact with the contact 214 of the upper member 210, whereas contact pressure is exerted in a region R4, which is in contact with the contact 214.

In the supporter 200, a sliding region SA2 in which the contact 214, the attitude of which changed as the flexure 213 of the upper member 210 bent, and the planar surface 225 of the lower member 220 can slide on each other, is provided. When the supported body S vibrates, the contact 214 and the planar surface 225 of the lower member 220 slide on each other in the sliding region SA2, whereby the supporter 200 in the state where the sliding region SA2 has been provided reduces or prevents transmission of the vibration of the supported body S to the floor surface F. Also, when the floor surface F vibrates, the contact 214 and the planar surface 225 of the lower member 220 slide on each other in the sliding region SA2, whereby the supporter 200 in the state where the sliding region SA2 has been provided reduces or prevents transmission of the vibration of the floor surface F to the supported body S.

As described above, the supporter 200 includes the upper member 210 including the load receiver 211 on which the projection P projecting downward from the supported body S is to be mounted and which receives the load L of the supported body S. The supporter 200 also includes the lower member 220 which is arranged on the floor surface F and on which the upper member 210 is to be mounted. The upper member 210 includes, in the center portion thereof in the plan view, the flexure 213 that bends downward under the load L of the supported body S received by the load receiver 211. The upper member 210 also includes, in the portion that surrounds the flexure 213, the contact 214 that comes in contact with the lower member 220. The attitude of the contact 214 changes as the flexure 213 bends downward. In the supporter 200, the sliding region SA2 in which the contact 214, the attitude of which changed as the flexure 213 bent downward, and the lower member 220 can slide on each other is formed by the load receiver 211 having received the load L of the supported body S. As a result, it is possible to reduce or prevent, irrespective of the magnitude of vibration, transmission of vibration of the supported body S to the floor surface F and transmission of vibration of the floor surface F to the supported body S.

When the supported body S or the floor surface F vibrates, the contact 214 and the lower member 220 slide on each other within the sliding region SA2. As a result, when the supported body S vibrates, the contact 214 and the lower member 220 slide on each other within the sliding region SA2, which makes it possible to reduce or prevent transmission of the vibration of the supported body S to the floor surface F. Also, when the floor surface F vibrates, the contact 214 and the lower member 220 slide on each other within the sliding region SA2, which makes it possible to reduce or prevent transmission of the vibration of the floor surface F to the supported body S.

In either one of the lower surface of the upper member 210 and the upper surface of the lower member 220, the fitted portion having a recessed shape may be provided, and in the other, the fitting portion which is to be fitted in the fitted portion and has a raised shape may be provided. As a result, even when the supported body S or the floor surface F vibrates while the projection P is mounted on the load receiver 211, it is possible to reduce or prevent excessive sliding of the upper member 210 relative to the lower member 220.

The upper member 210 and the lower member 220, in the plan view, may both have a circular or substantially circular outer edge with the same diameter. As a result, when the projection P is mounted on the load receiver 211, it is possible to provide the sliding region SA2 at a favorable position in the plan view.

The load receiver 211 may include the bottom of the recess 215 into which the projection P can be inserted. As a result, insertion of the projection P projecting downward from the supported body S into the recess 215 makes favorable mounting of the projection P possible.

The present invention has been described through the above preferred embodiments. However, the technical scope of the present invention is not limited to the description of the above preferred embodiments. It is apparent to those skilled in the art that various modifications or improvements can be added to the above preferred embodiments. It is also apparent from the scope of claims that the present invention also encompasses one or more of such modifications or improvements.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A supporter comprising:
an upper portion including a load receiver on which a projection projecting downward from a supported body is to be mounted and which receives a load of the supported body; and
a lower portion to be provided on a floor surface and on which the upper portion is to be mounted; wherein
the upper portion includes, in a center portion thereof in a plan view, a first flexure that bends downward under the load of the supported body received by the load receiver;
the lower portion includes a second flexure that bends downward when pressed by the first flexure bending downward; and
a sliding region in which the first flexure being bent downward and the second flexure being bent downward as pressed by the first flexure can slide on each other is defined by the load receiver having received the load of the supported body.

2. The supporter according to claim 1, wherein when the supported body or the floor surface vibrates, the first flexure and the second flexure slide on each other within the sliding region.

3. The supporter according to claim 1, wherein a gap is located between the first flexure and the second flexure when the load receiver is not receiving the load of the supported body.

4. The supporter according to claim 1, wherein the lower portion includes:
a plurality of legs in contact with the floor surface; and
an indentation included in the second flexure and surrounded by the plurality of legs.

5. The supporter according to claim 1, wherein the upper portion has a rigidity lower than that of the lower portion.

6. The supporter according to claim 1, wherein in either one of a lower surface of the upper portion and an upper surface of the lower portion, a fitted portion with a recessed shape is provided, and in the other, a fitting portion which is to be fitted in the fitted portion and has a raised shape is provided.

7. The supporter according to claim 1, wherein, in the plan view, the upper portion and the lower portion both have a circular outer edge with a same diameter.

8. The supporter according to claim 1, wherein the load receiver includes a bottom of a recess into which the projection can be inserted.

9. A supporter comprising:
an upper portion including a load receiver on which a projection projecting downward from a supported body is to be mounted and which receives a load of the supported body; and
a lower portion to be provided on a floor surface and on which the upper portion is to be mounted; wherein
the upper portion includes:

in a center portion thereof in a plan view, a flexure that bends downward under the load of the supported body received by the load receiver; and in a portion that surrounds the flexure, a contact that comes in contact with the lower portion;

an attitude of the contact changes as the flexure bends downward; and a sliding region in which the contact, the attitude of which changed as the flexure bent downward, and the lower portion can slide on each other is defined by the load receiver having received the load of the supported body.

10. The supporter according to claim 9, wherein when the supported body or the floor surface vibrates, the contact and the lower portion slide on each other within the sliding region.

* * * * *